United States Patent [19]

Mizukawa

[11] Patent Number: 5,313,239
[45] Date of Patent: May 17, 1994

[54] SHUTTER APPARATUS FOR STEREOSCOPIC CAMERAS

[75] Inventor: Shigeo Mizukawa, Omiya, Japan

[73] Assignee: Fuji Photo Optical Co., Ltd., Saitama, Japan

[21] Appl. No.: 974,462

[22] Filed: Nov. 12, 1992

[30] Foreign Application Priority Data

Nov. 12, 1991 [JP] Japan .................. 3-325163

[51] Int. Cl.⁵ .............................. G03B 9/10
[52] U.S. Cl. .................. 354/250; 354/254; 354/255; 354/261; 354/114
[58] Field of Search ............ 354/250, 114, 254, 255, 354/261; 352/205, 208

[56] References Cited

U.S. PATENT DOCUMENTS 2,361,661 10/1944 Sparling ..................... 354/250
3,446,132 5/1969 Fauth ........................ 354/250

*Primary Examiner*—Monroe H. Hayes
*Attorney, Agent, or Firm*—Ronald R. Snider

[57] ABSTRACT

A shutter apparatus for stereoscopic cameras for simultaneously taking a pair of stereoscopic photographs. A coupled shutter leaf is produced by integrally connecting two shutter leaves respectively disposed on two photographing lens portions provided with spots having different apertures. The coupled shutter leaf is rotatably supported by a connecting portion. The shutter leaf disposed at the photographing portion provided with the stop having a smaller aperture has a smaller width, and a weight for compensating for the weight of the shutter leaf which is reduced as a result of reducing the width thereof is provided. The exposure time of the photographing portion provided with the stop having a smaller aperture is longer than that of the other photographing portion, so that the quantity of incident light at the two photographing portions is the same. It is also possible that the shutter leaves have the same width and the connecting portion for rotatably supporting the coupled shutter leaf is shifted from the center of the two stops closer to the stop having a large aperture.

8 Claims, 4 Drawing Sheets

SHUTTER APPARATUS FOR STEREOSCOPIC CAMERAS

BACKGROUND OF THE INVENTION

This application claims the priority of Japanese Patent Application No. 3-325163 filed on Nov. 12, 1991 which is incorporated herein by reference.

1. Field of the Invention

The present invention relates to a shutter apparatus for stereoscopic cameras for simultaneously taking a pair of stereoscopic photographs so as to view a subject three-dimensionally.

2. Description of the Related Art

A stereoscopic camera for simultaneously taking a pair of stereoscopic photographs so as to view a subject three-dimensionally is well known. This type of camera is provided with, for example, two photographing lenses which enable the same subject to be taken from rightward and leftward points. The pair of stereoscopic photographs are printed on photographic paper or developed on reversal film (positive film) and viewed through binocular lenses so that the subject is viewed three-dimensionally.

FIG. 7 is an external view of a stereoscopic camera for taking the above-described stereoscopic photographs. The stereoscopic camera is composed of the main body 1 provided with a finder 2 and a shutter button 3, and two photographing lenses 4, 5 provided on the front surface of the main body 1 with an interval of about 30 mm between the two lenses 4, 5. A subject to be taken is positioned through the finder 2 and taken on the film mounted on the main body 1 through the photographing lenses 4, 5 by pressing the shutter button 3. Two images caught from different angles are thus projected on the film.

In another type of stereoscopic camera, the two photographing lenses 4, 5 have different object distance ranges; one is in focus in a short range and the other is in focus in a long range. Furthermore, the aperture of the stop for a short range is made smaller than the aperture of the stop for a long range so as to increase the depth of field. According to this type of camera, two stereoscopic photographs which are in focus in a short range and in a long range, respectively, are obtained. These two stereoscopic photographs enable the subject which is in focus in a wide range to be viewed three-dimensionally.

Since the conventional stereoscopic camera has the two photographing lenses 4, 5, as described above, two independent shutter mechanisms are provided for the photographing lenses 4, 5. The shutter leaves provided at the respective opening portions of the two shutters are simultaneously operated for a predetermined time by the respective shutter mechanisms so as to expose the film to a predetermined amount of light and to simultaneously photograph the same subject on two frames. Since two mechanisms are used to operate the shutter leaves simultaneously, the mechanisms become complicated and they are wasteful from the point of view of cost.

In the case of a simple (disposable) stereoscopic camera, it is necessary to simplify the mechanism as much as possible.

The applicant of the present invention has proposed a shutter which is capable of simultaneously operating the shutters at the two photographing portions by one leaf integrally connecting two shutter leaves. However, in the above-described type of camera in which the two photographing lenses 4, 5 are in focus in different photographing ranges, since the apertures of the spots are different in the two photographing portions, the quantity of incident light is different in the two photographing portions.

SUMMARY OF THE INVENTION

Accordingly, it is an object of the present invention to eliminate the above-described problems in the related art and to provide a shutter apparatus for stereoscopic cameras of the type for focusing the two photographing lenses on different object distance ranges which is capable of simplifying the shutter mechanism and reducing the cost, and which is capable of making the quantity of incident light uniform even if the apertures at the two photographing portions are different.

To achieve this end, the present invention provides a shutter apparatus for stereoscopic cameras provided with stops having different apertures at two photographing portions, the shutter apparatus comprising: a coupled shutter leaf which is obtained by integrally connecting two shutter leaves; and a connecting portion for rotatably supporting the coupled shutter leaf; the coupled shutter leaf simultaneously executes shutter releasing operations at the two photographing portions so that the operating time of the shutter leaf disposed at the photographing portion provided with the stop having a smaller aperture is shorter than the operating time of the shutter leaf disposed at the photographing portion provided with the stop having a larger aperture.

In order to realize such different exposure times, for example, the width of the shutter leaf disposed at the photographing portion provided with the stop having a smaller aperture is made smaller than that of the other shutter leaf, and a weight for compensating for the weight of the shutter leaf which is reduced as a result of reducing the width thereof is provided. In this case, the two photographing lenses at the respective photographing portions preferably have different focal lengths so as to take charge of different photographing ranges.

The coupled shutter leaf is provided with an operation lever projecting from the connecting portion, and by strongly pressing the operation lever by a shutter driving mechanism as if kicking it, the shutter releasing operation is executed.

According to the above-described structure, the coupled shutter leaf rocks around the support shaft, so that the two shutter leaf simultaneously open the shutter openings. Since the shutter leaf disposed at the photographing portion provided with the stop having a smaller aperture has a smaller width than the shutter leaf disposed at the photographing portion provided with the stop having a larger aperture, the exposure time of the photographing portion provided with the stop having a smaller aperture is longer than that of the other photographing portion, so that the quantity of incident light at the two photographing portions is the same. In addition, the weight balances the weights of the two shutter leaves, thereby enabling good shutter releasing operation.

It is also possible that the shutter leaves have the same width and the connecting portion for rotatably supporting the coupled shutter leaf is shifted from the center of the two stops closer to the stop having a large aperture. In addition, the shutter leaves may have different widths, as described above, and the connecting portion may be shifted toward the stop having a large aperture. These structures also bring about the same advantages.

According to the present invention, it is possible to simplify the shutter mechanism and reduce the cost.

The above and other objects, features and advantages of the present invention will become clear from the following description of the preferred embodiments thereof, taken in conjunction with the accompanying drawings.

DESCRIPTION OF THE PREFERRED EMBODIMENTS

First Embodiment

Figure 1:
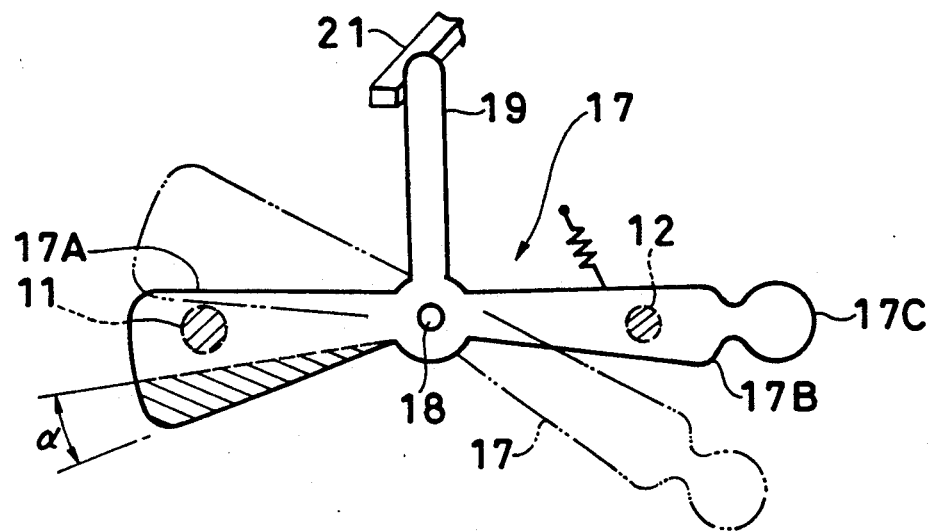
FIG. 1 shows the structure of a first embodiment of a shutter apparatus for stereoscopic cameras according to the present invention.
Figure 2:
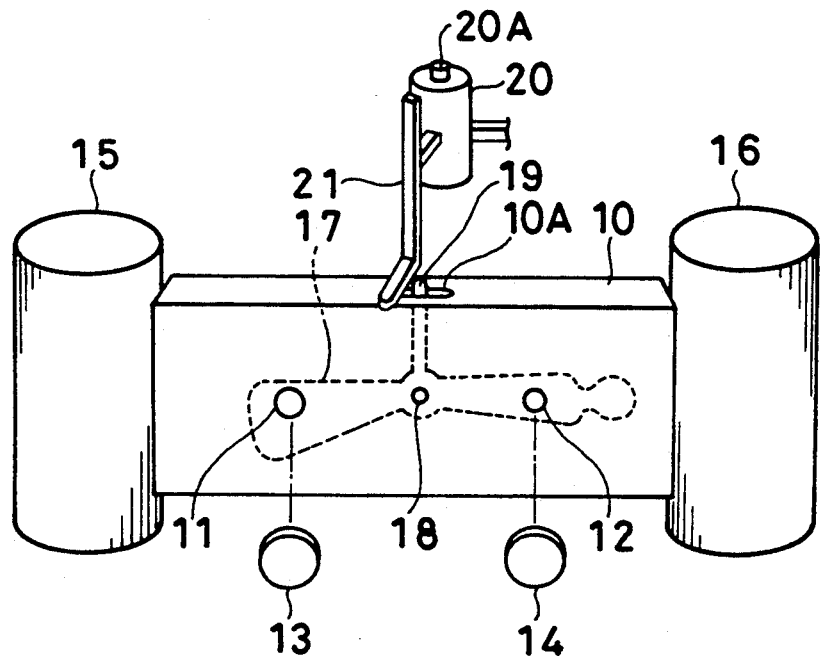
FIG. 2 is a perspective view of a simple stereoscopic camera incorporating the first embodiment shown in FIG. 1.

FIG. 1 shows the structure of a first embodiment of a shutter apparatus for stereoscopic cameras, and FIG. 2 shows the internal structure of a simple stereoscopic camera incorporating the shutter apparatus shown in FIG. 1. Referring first to FIG. 2, a first aperture stop 11 and a second aperture stop 12 are provided with a space of about 30 mm therebetween (between the centers of the openings) in a housing 10, and a first photographing lens 13 and a second photographing lens 14 are provided in front of the aperture stops 11 and 12, respectively. The first photographing lens 13 is in focus in a long range and the first aperture stop 11 has an aperture which produces a predetermined depth of field (depth of focus) in a long range. On the other hand, the second photographing lens 14 is in focus in a short range and the second aperture stop 12 has a small aperture so as to produce a great depth of field in a short range.

Figure 3:
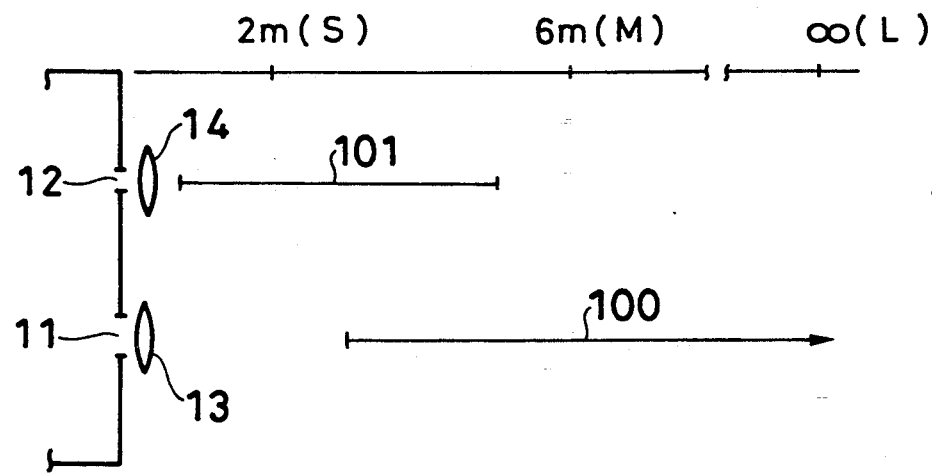
FIG. 3 is an explanatory view of the depths of field which are set by the camera incorporating the first embodiment.

FIG. 3 shows the depths of field which are set in this embodiment. According to this structure, the camera is focused on a subject at a distance of about 6 m by the first aperture stop 11 and the first photographing lens 13, and a photographing range 100 from the distance of 3 m to infinity is the permissible range in which the first photographing lens 13 is in focus. On the other hand, the camera is also focused on a subject at a distance of about 2 m by the second aperture stop 12 and the second photographing lens 14, and a photographing range 101 between the distance of about 0.5 m to about 5 m is the permissible range in which the second photographing lens 14 is in focus.

Referring to FIG. 2, a film accommodating portion 15 and a film take-up portion 16 are provided at both ends of the housing 10. On the back surface of the housing 10, a coupled shutter leaf 17 is provided so as to close both the first aperture stop 11 and the second aperture stop 12.

FIG. 1 shows the structure of the coupled shutter leaf 17. The coupled shutter leaf 17 is produced by connecting shuttle leaves 17A and 17B for closing the aperture stops 11 and 12, respectively, and supporting the shuttle leaves 17A, 17B at approximately the middle position by the housing 10 through a shutter shaft 18. The shuttle leaf 17B has a smaller width than the shuttle leaf 17A, and when the coupled shutter leaf 17 rotates around the shutter shaft 17, the shuttle leaf 17B rotates a smaller angle than the shuttle leaf 17A by an angle of α. As a result, the shuttle leaf 17B provided for the second aperture stop 12 having a smaller aperture allows light to enter the second photographing lens 14 during the shutter releasing operation longer than the light entering the first photographing lens 13 closed by the shuttle leaf 17A by the time corresponding to the time for which the hatched portion of the shuttle leaf 17A having the angle of o passes the first aperture stop 11 in one reciprocation.

A weight (mass balancer) 17C is formed on the shuttle leaf 17B so as to make the total weight of the weight 17C and the shuttle leaf 17B equal to the weight of the shuttle leaf 17A, thereby enabling a well-balanced shutter releasing operation.

An operation lever 19 for rotating the entire part of the shutter is provided at the upper portion of the shutter shaft 18 in such a manner as to project therefrom. The operation lever 19 is projected from an opening portion 10A provided on the upper surface of the housing 10, as shown in FIG. 2. A driving lever 21 of a driver 20 is provided on the upper surface of the housing 10 so as to operate the operation lever 19.

Figure 4:
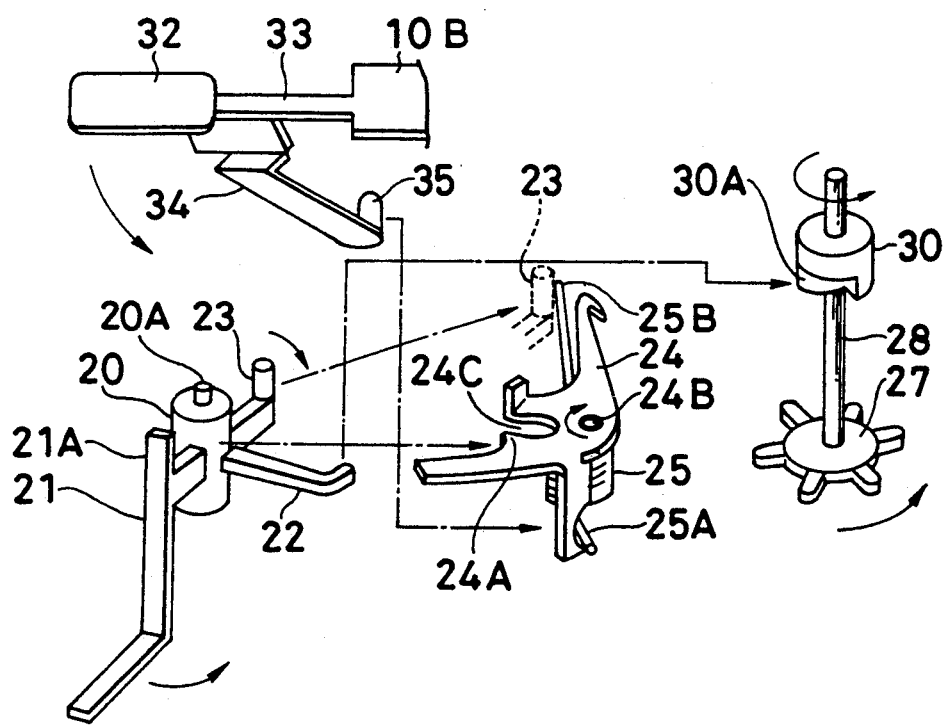
FIG. 4 is an exploded perspective view of the structure of the shutter driving mechanism of the first embodiment.
Figure 5:
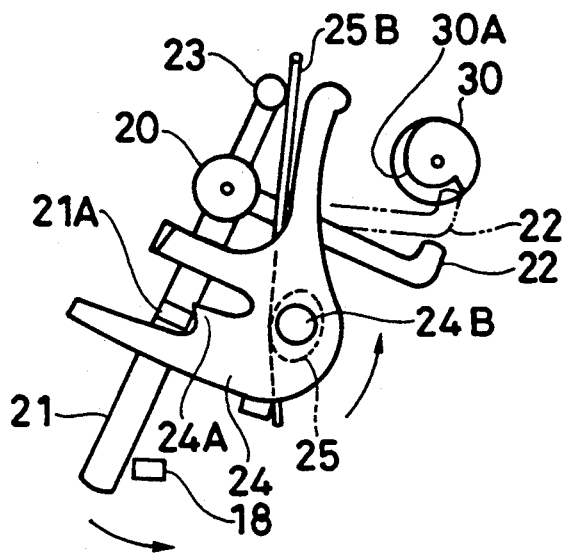
FIG. 5 is a plan view of the assembled shutter driving mechanism shown in FIG. 4, as viewed from above.

FIGS. 4 and 5 show a shutter driving mechanism including the driver 20. The driver 20 includes the driving lever 21, a cam operating piece 22 and a spring stopper 23. The driver 20 is rotatably supported by the housing 10 in the camera through a shaft 20A. A release lever 24 has a stopper 24A for stopping the rotation of the driving lever 21 in contact with the upper piece 21A of the driving lever 21. The release lever 24 is rotatably supported by a shaft 24B. A coil spring 25 is disposed around the shaft 24, and a pin 25A at one end of the coil spring 25 is engaged with the lower end of the release lever 24 so that the release lever 24 is urged clockwise. On the other hand, a pin 25B at the other end of the coil spring 25 is in contact with the spring stopper 23 of the driver 20 so that the driver 20 (driving lever 21) is urged counterclockwise.

A cam 30 is attached to the upper portion of a sprocket shaft 28 of a sprocket 27 which controls the movement of a film at the time of taking up the film by engaging the teeth with the perforations of the film. The sprocket 27 is disposed in such a manner that the cam operating piece 22 of the driver 20 comes into contact with a sliding groove 30A of the cam 30. Therefore, when the cam 30 rotates counterclockwise, the driver 20 is rotated clockwise against the urging force by the cam operating piece 22 which slides in the sliding groove 30A.

A shutter button 32 shown in the above portion of FIG. 5 is attached to a housing 10B through an elastic member 33 in such a manner as to rock by a pressing operation. An operating pin 35 for rotating the release lever 24 counterclockwise is provided below the shutter button 33 through a connecting member 34.

The operation of the first embodiment having the above-described structure will now be explained. Before photographing, the upper piece 21A of the driving lever 21 of the driver 20 is retained by the stopper 24A of the release lever 24, as shown in FIG. 5. When the shutter button 32 is pressed in this state, the release lever 24 is rotated counterclockwise against the urging force of the coil spring 25 by the operating pin 35. By this operation, the stopper 24 of the release lever 24 releases the upper piece 21A of the driving lever 21 and drops the upper piece 21A into a groove 24C, so that the driving lever 21 rotates counterclockwise against the urging force of the coil spring 25.

As a result, the driving lever 21 strongly moves the operation lever 19 shown in FIGS. 1 and 2 as if by kicking it, and the coupled shutter leaf 17 is rotated clockwise as indicated by the broken line in FIG. 2, and the shuttle leaves 17A and 17B open and close the first aperture stop 17A and the second aperture stop 17B, respectively. When the hatched portion of the shuttle leaf 17A having the angle of $\alpha$ is passing the first aperture stop 11, the other shuttle leaf 17B has already opened the second aperture stop 12. In other words, the second aperture stop 12 is open longer than the first aperture stop 11 by the time corresponding to double the time for which the hatched portion of the shuttle leaf 17A having the angle of $\alpha$ passes the shuttle leaf 17A. Consequently, the quantity of light which is allowed to enter through the second aperture stop 12 having a smaller aperture it the same as the quantity of light which is allowed to enter through the first aperture stop 11, so that good stereoscopic photographs are obtained. A good shutter releasing operation is secured by the weight 17C.

When the shutter releasing operation is finished in this way, the cam operating piece 22 of the driver 20 engages the sliding groove 30A of the cam 30 by the counterclockwise rotation of the driver 20, as indicated by the broken line in FIG. 5. When the film is taken up, since the sprocket 27 rotates counterclockwise, the cam 30 rotates counterclockwise together with the sprocket 27. The driver 20 is rotated clockwise by the cam operating piece 22 against the urging force of the coil spring 25, and the upper piece 21A of the driving lever 21 is retained by the stopper 24A of the release lever 24, thereby allowing photographing.

Second Embodiment

Figure 6:
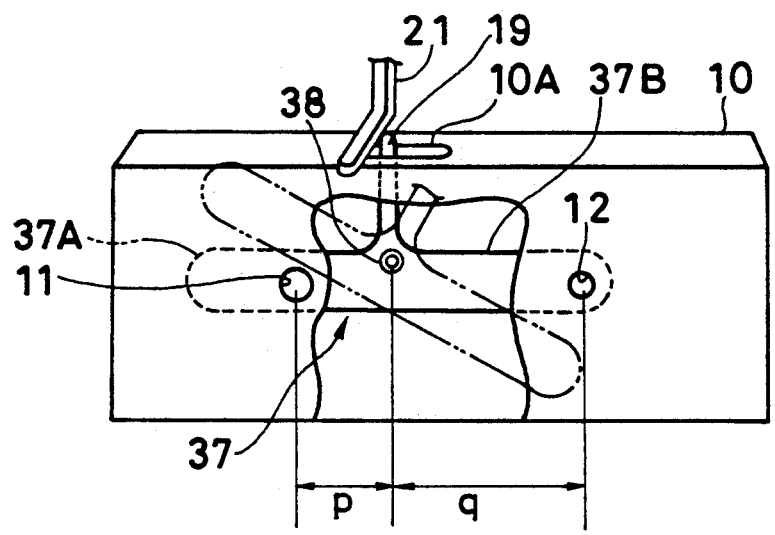
FIG. 6 shows the structure of a second embodiment of a shutter aparatus for stereoscopic cameras according to the present invention.
Figure 7:
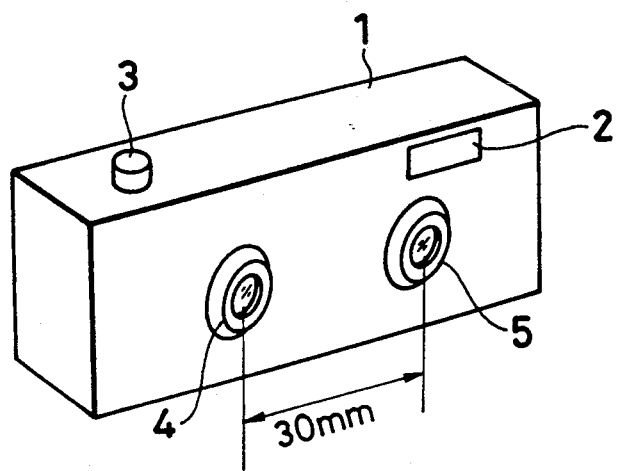
FIG. 7 is an external view of a conventional stereoscopic camera.

In the first embodiment, the exposure time for the first photographing lens 13 is made different from that for the second photographing lens 14 by using the shuttle leaves 17A and 17B having different widths. Different exposure times are also realized by shifting the position at which the shutter shaft 18 is attached to the coupled shutter leaf 17, as in a second embodiment shown in FIG. 6. In the second embodiment, shuttle leaves 37A and 37B of a coupled shutter leaf 37 have the same width. A shutter shaft 18 is attached to the coupled shutter leaf 37 not at the middle position between the first aperture stop 11 and the second 12 aperture stop but to a position closer to the first aperture stop 11. As a result, the ranges in which the shuttle leaves rotate are different with respect to the positions of the first aperture stop 11 and the second aperture stop 12, as indicated by the broken lines. That is, the shuttle leaf 37B on the second aperture stop 12 side rotates in a larger range. If it is assumed that the distance between the first aperture stop 11 and the shutter shaft 38 is p and the distance between the second aperture stop 12 and the shutter shaft 38 is q, the amount of rotation of the coupled shutter leaf 37 at the second aperture stop 12 is q/p of the amount of rotation thereof at the first aperture stop 11. Consequently, the exposure time of the second aperture stop 12 is longer than that of the first aperture stop 11, so that the exposing conditions are made the same.

The structure of the first embodiment may be combined with that of the second embodiment. Actually, an appropriate combination of these embodiments with due consideration of other components of a camera is preferable. The shutter driving mechanism in these embodiments is only one example, and other shutter driving mechanisms conventionally used may be used to drive the coupled shutter leaf 17. Although the operation lever 18 of the coupled shutter leaf 17 is projected perpendicularly relative to the line connecting the two shutter leaves 17A and 17B in these embodiments, the operation lever 18 may be inclined and the degree of inclination is preferably adjusted with respect to the position of the shutter button 32.

While there has been described what are at present considered to be preferred embodiments of the invention, it will be understood that various modifications may be made thereto, and it is intended that the appended claims cover all such modifications as fall within the true spirit and scope of the invention.

I claim:

1. A shutter apparatus for stereoscopic cameras provided with stops having different apertures at two photographing portions so as to simultaneously take a pair of pictures, said shutter apparatus comprising:
   a coupled shutter leaf which is obtained by integrally connecting two shutter leaves, said shutter leaf of said coupled shutter leaf disposed at said photographing portion provided with said stop having a smaller aperture has a smaller width than the other shutter leaf; and
   a connection portion for rotatably supporting said coupled shutter leaf;
   said coupled shutter leaf simultaneously executes shutter releasing operations at said two photographing portions so that the operating time of the shutter leaf disposed at the photographing portion provided with the stop having a smaller aperture is shorter than the operating time of the shutter leaf disposed at the photographing portion provided with the stop having a larger aperture.

2. A shutter apparatus for stereoscopic cameras according to claim 1, wherein said shutter leaf disposed at said photographing portion provided with said stop having a smaller aperture is provided with a weight for compensating for the weight of said shutter leaf which is reduced as a result of reducing the width thereof.

3. A shutter apparatus for stereoscopic cameras according to claim 1, wherein said coupled shutter leaf is provided with an operation lever projecting from said connecting portion, so that said shutter releasing operations are executed by strongly pressing said operation lever by a shutter driving mechanism as if kicking said operation lever.

4. A shutter apparatus for stereoscopic cameras according to claim 1, wherein lenses provided on said two photographing portions have different focal lengths so as to take charge of different photographing ranges.

5. A shutter apparatus for stereoscopic cameras according to claim 1, wherein said shutter leaf of said coupled shutter leaf disposed at said photographing portion provided with said stop having a smaller aperture has a smaller width than the other shutter leaf, and said connecting portion for rotatably supporting said coupled shutter leaf is shifted from the center of said stops closer to said stop having a large aperture.

6. A shutter apparatus for stereoscopic cameras according to claim 1, wherein said stereoscopic cameras are disposable simple cameras.

7. A shutter apparatus for stereoscopic cameras provided with stops having different apertures at two photographing portions so as to simultaneously take a pair of pictures, said shutter apparatus comprising:

- a coupled shutter leaf which is obtained by integrally connecting two shutter leaves having an upper and lower portion and said shutter leaf of said coupled shutter leaf disposed at said photographing portion provided with said stop having a smaller aperture has a smaller width than the other shutter leaf;
- a connecting portion for rotatably supporting said coupled shutter leaf;
- a weight which is formed of said coupled shutter leaf disposed at said portion having a smaller width;
- an operation lever for rotating said coupled shutter leaf disposed at said upper portion and projecting therefrom; and
- a driving lever located so as to operatively engage said operation lever;

said coupled shutter leaf simultaneously executes shutter releasing operations at said two photographing portions so that operating time of the shutter leaf disposed at the photographing portion provided with the stop having a smaller aperture is shorter than the operating time of the shutter leaf disposed at the photographing portion provided with the stop having a larger aperture.

8. A shutter apparatus for stereoscopic cameras provided with stops having different apertures at two photographing portions so as to simultaneously take a pair of pictures, said shutter apparatus comprising:

- a coupled shutter leaf which is obtained by integrally connecting two shutter leaves having the same width and said connecting portion for rotatably supporting said coupled leaf is shifted from the center of said stops closer to said stop having a larger aperture; and
- a connecting portion for rotatably supporting said coupled shutter leaf;

said coupled shutter leaf simultaneously executes shutter releasing operations at said two photographing portions so that operating time of the shutter leaf disposed at the photographing portion provided with the stop having a smaller aperture is shorter than the operating time of the shutter leaf disposed at the photographing portion provided with the stop having a larger aperture.

* * * * *